(12) United States Patent
Huang et al.

(10) Patent No.: US 12,284,401 B2
(45) Date of Patent: Apr. 22, 2025

(54) CONTENT DISTRIBUTION SERVER AND METHOD

(71) Applicant: SAMSUNG ELECTRONICS CO., LTD., Suwon-si (KR)

(72) Inventors: Wei Huang, Jiangsu (CN); Weijun Shi, Jiangsu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 220 days.

(21) Appl. No.: 17/554,308

(22) Filed: Dec. 17, 2021

(65) Prior Publication Data

US 2022/0109713 A1    Apr. 7, 2022

Related U.S. Application Data

(63) Continuation of application No. PCT/KR2020/008382, filed on Jun. 26, 2020.

(30) Foreign Application Priority Data

Jun. 28, 2019  (CN) .......................... 201910577876.5
Oct. 11, 2019  (CN) ......................... 201910962775.X

(51) Int. Cl.
*H04L 65/75*    (2022.01)
*G06N 20/00*    (2019.01)
(Continued)

(52) U.S. Cl.
CPC ....... *H04N 21/23106* (2013.01); *G06N 20/00* (2019.01); *H04L 65/611* (2022.05);
(Continued)

(58) Field of Classification Search
CPC ....... H04L 65/75; H04L 65/611; G06N 20/00; H04N 21/2402; H04N 21/2662
See application file for complete search history.

(56) References Cited

U.S. PATENT DOCUMENTS 9,241,174 B1   1/2016   Rogers
9,276,983 B2   3/2016   Rosenzweig et al.
(Continued)

FOREIGN PATENT DOCUMENTS

CN    102404648 A    4/2012
CN    103348691 A    10/2013
(Continued)

OTHER PUBLICATIONS

Extended European Search Report dated Jun. 20, 2022 for EP Application No. 20832104.2.
(Continued)

*Primary Examiner* — Hua Fan
(74) *Attorney, Agent, or Firm* — NIXON & VANDERHYE P.C.

(57) ABSTRACT

A content distribution server, including a central server and a plurality of edge servers. The central server may be configured to obtain popularity ranking information of the video files according to video file requesting history of user terminals, and obtain sections of multiple video files based on the popularity ranking information from a content server and transmit the sections to the edge server. The plurality of edge servers may include a file caching server and a mobile edge computing server of a user terminal, and each of the edge server(s) may be configured to cache sections of the multiple video files which are received from the central server, and send a video file requested by the user terminal to the user terminal.

8 Claims, 13 Drawing Sheets

(51) Int. Cl.
*H04L 65/611* (2022.01)
*H04N 21/231* (2011.01)
*H04N 21/24* (2011.01)
*H04N 21/2662* (2011.01)

(52) U.S. Cl.
CPC ......... *H04L 65/75* (2022.05); *H04N 21/2402* (2013.01); *H04N 21/2662* (2013.01)

(56) References Cited

U.S. PATENT DOCUMENTS

| | | | |
|---|---|---|---|
| 9,860,335 B2 | 1/2018 | Zhao | |
| 9,942,577 B1 | 4/2018 | Burford et al. | |
| 2005/0066356 A1* | 3/2005 | Stone | H04N 21/4408 380/255 |
| 2005/0086501 A1 | 4/2005 | Woo et al. | |
| 2008/0281946 A1 | 11/2008 | Swildens et al. | |
| 2013/0054729 A1 | 2/2013 | Jaiswal et al. | |
| 2013/0204961 A1* | 8/2013 | Fliam | H04L 67/568 709/214 |
| 2017/0339242 A1 | 11/2017 | Westphal et al. | |
| 2019/0007756 A1* | 1/2019 | Navali | H04L 63/0428 |
| 2019/0110092 A1 | 4/2019 | Major | |
| 2019/0158622 A1* | 5/2019 | Balakrishnan | H04L 67/5682 |
| 2019/0190971 A1 | 6/2019 | Chen et al. | |

FOREIGN PATENT DOCUMENTS

| | | |
|---|---|---|
| CN | 104284201 A | 1/2015 |
| CN | 104811740 A | 7/2015 |
| CN | 105228027 A | 1/2016 |
| CN | 105578308 A | 5/2016 |
| CN | 107277561 A | 10/2017 |
| CN | 107889160 A | 4/2018 |
| CN | 107968835 | 4/2018 |
| CN | 109788319 A | 5/2019 |
| JP | 2017-139687 A | 8/2017 |
| JP | 6691553 | 4/2020 |
| KR | 10-2014-0031442 | 3/2014 |
| WO | WO2020/263024 A1 | 12/2020 |

OTHER PUBLICATIONS

Kyungmo Park et al., "Use Cases and Requirements for NBMP (v4)", Apr. 21, 2018, ISO/IEC JTC1/SC29/WG11, 31pgs.
Liao Jialing et al., "MDS Coded Cooperative Caching for Heterogeneous Small Cell Networks", Globecom 2017 2017 IEEE Global Communications Conference, Dec. 4, 2017, 7 pgs.
Piao Zhuying et al., "Recent Advances of Edge Cache in Radio Access Networks for Internet of Things: Techniques, Performances, and Challenges", IEEE Internet of Things Journal, vol. 6, No. 1, Feb. 1, 2019.
Fadlallah Yasser et al., "Coding for Caching in 5G Networks", IEEE Communications Magazine, IEEE Service Center, vol. 55, No. 2, Feb. 1, 2017, 8pgs.
Jiang Wei et al., "Multi-Agent Reinforcement Learning Based Cooperative Content Caching for Mobile Edge Networks", IEEE Access, vol. 7 No. 13, May 13, 2019, 12pgs.
International Search Report for PCT/KR2020/008382 mailed Oct. 6, 2020, 3 pages.
Written Opinion of the ISA for PCT/KR2020/008382 mailed Oct. 6, 2020, 6 pages.
Notification of the Recording of a Change mailed Jul. 23, 2021 for PCT/KR2020/008382.
Notification of Publication of International Application No. mailed Dec. 30, 2020 for PCT/KR2020/008382.
Chinese Office Action dated Apr. 14, 2021 for CN Application No. 201910962775.X.
Chinese Notice of Allowance dated Nov. 3, 2021 for CN Application No. 201910962775.X.
European Office Action dated Apr. 10, 2024 for EP Application No. 20832104.2.

* cited by examiner

CONTENT DISTRIBUTION SERVER AND METHOD

CROSS-REFERENCE TO RELATED APPLICATIONS

This application is a continuation of International Application No. PCT/KR2020/008382 designating the United States, filed on Jun. 26, 2020, in the Korean Intellectual Property Receiving Office and claiming priority to CN Patent Application Nos. 201910577876.5, filed on Jun. 28, 2019, and 201910962775.X filed Oct. 11, 2019, in the China Intellectual Property Office, the disclosures of which are incorporated by reference herein in their entireties.

BACKGROUND

Field

This disclosure relates to data communications, and for example, to a content distribution server and/or method.

DESCRIPTION OF RELATED ART AND SUMMARY

In recent years, global Internet traffic has increased dramatically. Video traffic is the main contributor to the growth and may continue to dominate network traffic. This trend is the result of the growing popularity of video contents consumption using devices such as smartphones, tablet computers, gaming devices, smart TVs, etc. Cisco forecasts that network traffic will increase exponentially in the future. Soon, the number of global Internet users will reach 4.6 billion, the number of network accessing devices will reach 27.1 billion, the proportion of video data access traffic will increase to 82%, and the amount of data generated each month will exceed 190EB (1 EB equals 230 GB).

The large number of smart terminal devices accessing the Internet have brought unprecedented pressure to the backbone network. Particularly, applications involving high-definition video, live broadcasts of games, AR/VR, etc. consume a lot of computing resources, network resources and storage resources, and the server, the communication networks and the data transmission systems may under great pressure, especially during periods when a large number of users concentrates to access services.

At present, most OTT (Over The Top) services generally adopt unicast delivery as the video data transmission method. Unicast delivery refers to establishing an individual data channel between a client and a media server, and each data packet sent by a server is and/or can only be transmitted to one client. Each user has to send an individual query to the media server, and the media server has to send the data packet requested by each user separately to that user.

Unicast delivery usually consumes a large amount of network bandwidth. For example, when there are one million viewers concurrently watching the same video source at a data rate of 2 Mbps using an operator's network, the server has to stream the content to each of the users which makes the network load at around 2 Tbps. Such huge redundancy places a heavy burden on the server which may take a long time to respond, and may even cause the video to stop playing. Moreover, it also forces content providers to purchase better hardware and greater bandwidth to ensure certain quality of service, which causes the operation and maintenance costs to rise sharply.

Video requests show highly time-varying characteristics, that is, network may be congested during periods of network link access peaks while having an insufficient utilization rate during periods of network link access troughs. A common practice to cope with this phenomenon is to pre-cache requested contents on the network (e.g., Proactive Caching). For example, a user terminal may pre-store contents frequently accessed by the user into the local cache during a network link access trough, so that the user's subsequent data requests can be responded to from the local cache, thereby the load on network links during peak hours can be reduced.

In order to alleviate the pressure on the bandwidth of video transmission, the method currently used is to deploy a cache server near end users to form a video cache system. The inventor(s) found that the traditional video cache system generally sends data only in response to the request of a single user. Such data transmission method is inflexible and does not take full advantage of the network cache and network coding resources that have the potential to be coordinated. This makes the cost of each transmitted object or file not suitable, and there is still room for further optimization.

Certain example embodiments of this disclosure provide a content distribution server which may include: a central server, a plurality of edge servers and a user terminal, wherein:

a central server is configured to obtain popularity ranking information of the video files according to video file requesting history of user terminals, and obtain sections of multiple video files based on the popularity ranking information from a content server and transmit the sections to the edge server; and a plurality of edge servers is a file caching server and a mobile edge computing server of a user terminal, and each of the edge servers is configured to cache the sections of the multiple video files which are received from the central server, and send a video file requested by the user terminal to the user terminal.

Certain example embodiments of this disclosure provide a content distribution method wherein:

obtaining, by a central server, popularity ranking information of video files according to video file requesting history of user terminals; caching by each of edge servers, in advance sections of multiple video files based on the popularity ranking information; sending, by the central server when a user terminal requests a video file, the video file requested by the user terminal to the edge server through multicast ABR or through coded caching according to the video file requested by the user terminal.

Certain example embodiments of this disclosure provide a content distribution server and method, so as to reduce the bit rate of video data transmissions, decrease the load of data links at the server, reduce the delay of obtaining video resources by users, and improve the quality of service and experience provided by user terminals.

BRIEF DESCRIPTION OF THE DRAWINGS

In relation to the description of the drawings, the same or similar reference numerals may be used with respect to the same or similar elements. Additionally, the above and other aspects, features and advantages of certain embodiments of the present disclosure will be more apparent from the following detailed description, taken in conjunction with the accompanying drawings, in which.

Any of the embodiment(s) described herein may be used in conjunction with any other embodiment(s) described herein.

DETAILED DESCRIPTION

In order to make the purpose, technical schemes and merits clearer, the following describes various example embodiments in further detail with reference to the accompanying drawings and embodiments.

Figure 1:
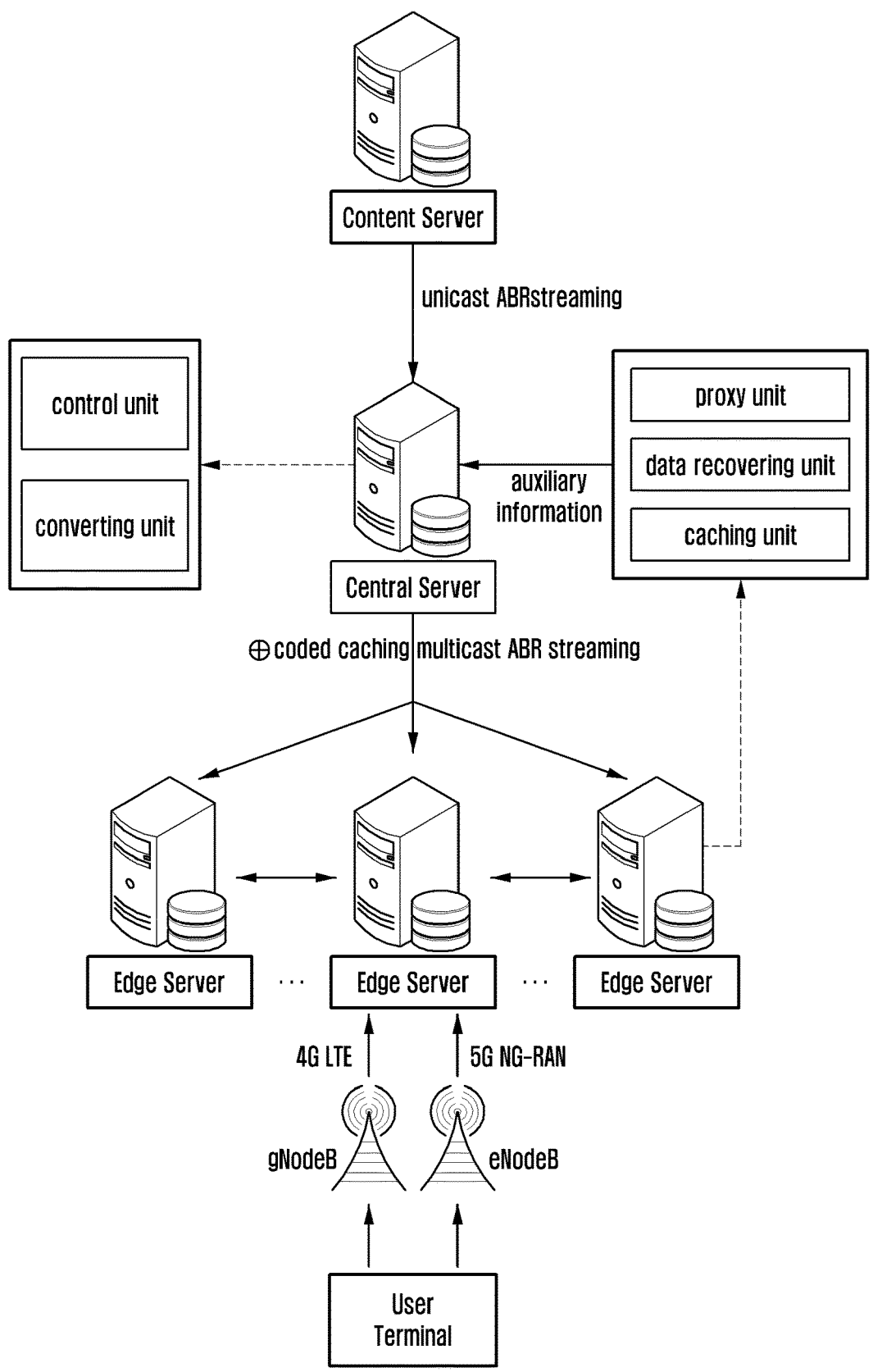
FIG. 1 is a block diagram illustrating an example framework of a content distribution system based on coded caching and multicast adaptive bit rate streaming according to various embodiments.

In order to solve the problem of the prior art, certain example embodiments provide a content distribution system which is based on coded caching and multicast adaptive bit rate streaming technology. The architecture of the system may mainly include: a content server, a central server, an edge server and a user terminal, as shown in FIG. 1.

Content server: The content server stores multiple video files accessible by user terminals in advance. The stored files are divided into different sections according to different bit rates, resolutions, time lengths and other parameters of videos. The sizes of the files are not limited, may be the same or different. The content server sends a file requested by the user terminal to the central server through unicast adaptive bit rate (ABR).

Central server: The central server is a data processing center. There may be one or multiple central servers in the system. The central server is responsible for file transmission and command interactions between the content server and the edge server. The central server is configured to obtain popularity ranking information of the video files according to video file requesting history of user terminals, obtain sections of video files which are most popular according to the popularity ranking information from the content server, and send the sections of the most popular video files to the edge server during a trough period of network link transmission. Specifically, the central server includes a control unit comprising control circuitry and a converting unit comprising circuitry.

(1) The control unit may collect statistics of records of requests for video files of each user terminal, and generate the popularity ranking information of the video files. During a network link transmission trough period, the control unit may randomly select sections of multiple video files according to the popularity ranking information of the video files and send the sections to the edge server for pre-caching. Meanwhile, the control unit may keep records of files requested by different user terminals. When file requests are received from multiple user terminals, the control unit may judge whether the multiple user terminals request the same file or different files according to previous records of file requests, and notify the converting unit of the judging result.

(2) The converting unit is responsible for determining the file distribution method when file requests are received from multiple user terminals, and sending the files requested by the user terminals through multicast ABR or through coded caching depending on the video files requested by the user terminal. Specifically, when the multiple user terminals request the same file, the converting unit may use the multicast ABR for file transmission to reduce the transmission bit rate and improve the transmission efficiency; when the popularity of the video file requested by the user terminal decreases and the multiple user terminals request different files, the converting unit seamlessly switches from the multicast ABR mode to the coded caching mode. Meanwhile, the converting unit may encode the different files requested by the multiple user terminals according to files sent by the content server and the files pre-stored in local cache of the edge server, so as to make full or more full use of the coded caching technology to reduce the transmission bit rate and improve the transmission efficiency. The converting unit may send the encoded files to the edge server through multicast ABR via a shared link.

Edge server: The edge server is a file caching server and a mobile edge computing server of the user terminals, and is configured to cache sections of the most popular video files. The edge server may include a proxy unit comprising circuitry, a recovering unit comprising encoding and/or decoding circuitry, and a caching unit comprising at least one cache.

(1) The proxy unit may collect and report auxiliary information to the control unit in the central server. The auxiliary information may include, but not limited to, access traffic volume, a file ID, a file name, a file category, file access duration, terminal user preferences, bandwidth information, proxy unit ID, current status of cache, location of user terminal, seasonal channel and other information etc. The control unit of the central server may use the information to perform operations such as obtaining statistics of file popularity ranking, coded caching, etc.

(2) The recovering unit may decode the encoded file according to the received encoded file and a file existing in its local cache to obtain the requested file.

(3) The caching unit is responsible for caching files requested by user terminals and sending the files to the user terminals, such as a TV set-top box, a personal computer, a tablet computer, a mobile phone, or other terminal devices.

User terminal: The user terminal connects to the edge server, and uses the standard ABR protocol for requesting files and receiving files sent by the edge server.

Based on the above content distribution system, certain example embodiments provide a content distribution method. The method is based on the coded caching technology, and specifically includes two stages: a caching stage and a transmission stage.

(1) Caching Stage

During a network link access trough, the central server may randomly select sections of multiple files from the content server based on the popularity ranking information of the files stored in the content server, and pre-cache the sections of the files in the local cache of the edge server.

Preferably, the files for caching are transmitted during a period of network link access trough because the user request volume is small and the data links are idle in the trough period. The edge server may pre-cache the sections of the files from the content server. The edge server may be closer to user terminals than the content server which serves as the data source, thus may respond to and handle file requests of the user terminal more quickly.

In certain example embodiments, since the amount of data pre-stored by the edge server is limited by its physical cache capacity, the edge server may preferentially cache files with high popularity according to the popularity ranking information of the files stored in the content server. Furthermore, randomly caching sections of multiple files can increase the chance of coded multicast transmission during the transmission phase, thereby reducing the bit rate during file transmission.

(2) Transmission Stage

The transmission stage may adopt the following two methods depending on the different files requested by the user terminals.

1) In the transmission stage, when different user terminals request the same file, the system may use multicast ABR to transmit the file requested by the user terminals. Example steps are as follows.

Step 1, multiple user terminals calculate parameters such as the bit rate and the resolution of the requested file based on the current status of network bandwidth, and send a video file request message requesting the same video file from multiple edge servers respectively.

Step 2, multiple edge servers respectively send a file request message to the central server.

Step 3, the central server sends a file request message to the content server.

Step 4, the content server sends the requested file to the central server through unicast ABR.

Step 5, the central server sends the file to the edge server through multicast ABR via a shared link.

Step 6, the edge server caches the file.

Step 7, the edge server sends the requested file to the user terminal.

Step 8, the user terminal receives the file sent by the edge server.

Preferably, in step 4, since all of the user terminals request the same file, the multicast ABR transmission mode is appropriate. The content server may send the file requested by the user terminals to the central server only once, and the central server sends the file to the edge servers in a multicast manner, thereby the bit rate of the file transmission can be reduced.

2) In the transmission stage, when different user terminals request different files, the system may instead use the coded caching mode to transmit the different files requested by the multiple user terminals. Example specific steps are as follows.

Step 1, the user terminals calculate parameters such as the bit rate and the resolution of respective requested files based on the current status of network bandwidth and send a file request message.

Step 2, the edge server corresponding to the user terminals processes the file request messages. The edge server first searches the local cache for the requested file; if the requested file, performs step 14; otherwise, performs step 3.

Step 3, the edge server broadcasts a file request message to other nearby edge servers and starts a message reply timer.

Step 4, other edge servers check whether the requested file is in respective local cache. If the requested file is found, step 5 is performed; otherwise, step 7 is performed.

Step 5, an edge servers sends the requested file to the edge server that broadcasts the request message.

Step 6, the edge server that broadcasts the request message determines whether the message reply timer has expired. If the message reply timer has expired, step 8 is performed; otherwise, step 7 is performed.

Step 7, the edge server that broadcasts the request message receives and caches the file, and step 14 is performed.

Step 8, the edge server sends a file request message to the central server.

Step 9, the central server sends a file request message to the content server.

Step 10, the content server sends the requested file to the central server through unicast.

Step 11, the central server encodes the file to be transmitted according to the received file sent by the content server and files stored locally in the cache of the edge server, and multicasts the encoded file to the edge servers through a shared link through multicast manner;

Step 12, the edge server decodes the encoded file obtained from the central server according to sections of the file pre-cached locally to obtain the requested file content.

Step 13, the edge server caches the file.

Step 14, the edge server sends the requested file to the user terminal.

Step 15, the user terminal receives the file sent by the edge server.

Preferably, in step 3, in order to reduce the network transmission delay, when processing the file request of the user terminal, the edge server may preferentially broadcast the request message to other nearby edge servers before sending the file request message to the content server. Compared with the content server, the other edge servers may be closer to the edge server that broadcasts the request message, thus in this case, the delay of obtaining requested data from the other edge servers may be smaller. Furthermore, the edge server broadcasting the request may start a message reply timer when sending the broadcast request message, the duration of the timer may be set according to the delay of the transmission network, and the edge server sending the broadcast request may discard a timeout reply message to the broadcast request.

In step 11, the central server may send the encoded file content to the edge server. The encoding method may be: sections of the file to be requested may be pre-stored in the edge server, and the other sections of the file to be requested by the edge server may be stored the caches of edge servers other than the edge server, and these sections of the file to be requested by the edge server are the contents to be encoded. The encoding operation of applying bitwise XOR operation to all the to be encoded files requested by the edge server is called the encoding process.

Preferably, in step 11, the central server sends the encoded file to the edge server requesting the file through multicast.

Preferably, in step 12, the edge server may directly obtain sections of the pre-stored requested file from the local cache, and at the same time receive the encoded file transmitted by the central server, performing decoding by combining the received file with the other sections of the file pre-stored in the local cache to obtain the contents of the requested file that is not pre-stored in the local cache.

In order to facilitate understanding of the technical schemes of certain example embodiments, some example embodiments are referred to as examples for further explanation with reference to the drawings. The following embodiments do not constitute a limitation on the protection scope of the present application. Any of the embodiment(s) described herein may be used in conjunction with any other embodiment(s) described herein.

Example Embodiment One

FIG. 1 is a schematic diagram illustrating the structure of a content distribution system based on coded caching and multicast adaptive bit rate streaming according to an example embodiment. The system may include: a content server, a central server, an edge server, and a user terminal. Examples of each component are explained in detail below.

(1) Content server: The content server stores multiple video files accessible by user terminals. The video files may have the same size or different sizes.

In this embodiment, the content server may be, for example, an MPEG-DASH server.

The Dynamic Adaptive Streaming over HTTP (DASH) is a standard jointly developed by MPEG and ISO at the end of 2011, and is one of popular adaptive bit rate streaming (ABR) media techniques in Internet video streaming ABR is an example method for transmitting video streams over HTTP, which first encodes source contents into streams with multiple bit rates; each stream with a different bit rate is divided into small multi-second segments; the player client can identify valid streams with different bit rates using the manifest file of each stream. In this embodiment, the example DASH may use for example HTTP as the communication protocol, and may detect the in real-time bandwidth and CPU capability of the user and adjust the quality of the video stream accordingly. Example advantages of DASH include: less buffering, quick startup, high-quality services for high-end and low-end connections, and high-quality audio and video contents transmitted to TVs connected to the Internet, set-top boxes and mobile terminal devices through networks.

In this embodiment, the content server may divide multiple video files into multiple segments (also called "slices") of equal time length for storing, and each segment may be encoded with different bit rates and resolutions, thus the size of each fragment file is not fixed.

(2) Central server: The central server is a data processing center of the system, and there may be one or multiple central servers. The central server, comprising processing circuitry, is responsible for data transmission and command interactions between the edge server and the content server. The central server may include a control unit comprising control circuitry and a converting unit also comprising circuitry.

The control unit is configured to cache files. Example proactive caching methods include:

1. proactively caching highly popular contents at a node during periods of low traffic, assuming that the popularity of the content or the user's request preferences are known;

2. encouraging caching by charging traffic at different prices by the operators during peak business hours using the Stickerberg model of the game theory, emphasizing the prices between operators and content providers and cache capacity limits of small cells in instead of considering user terminal networks;

3. grouping the caches to avoid users with high similarity in the same group caching the same files, and at the same time optimizing user experience indicators and etc.

This example embodiment adopts the above first proactive caching method. Various example embodiments involve caching in advance file blocks of videos that have a higher probability to be accessed by users, e.g., file blocks that are the most likely to be downloaded by users of the edge server.

According to the above method 1, the control unit, comprising control circuitry, obtains statistics on the popularity ranking information of the video files based on records of video file requests of different users, randomly selects sections of some top-ranked video files according to the popularity ranking information of the video files, and send the sections to the edge server for pre-caching during periods of network link access trough.

Figure 2:
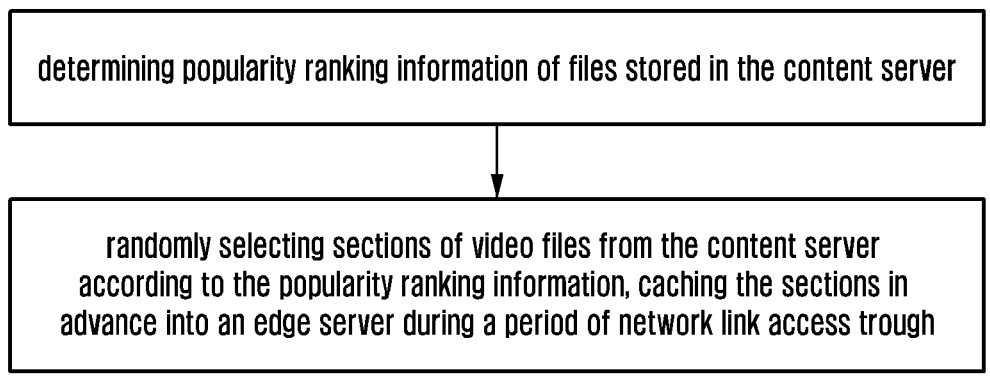
FIG. 2 is an example schematic diagram illustrating an example processing flow of the caching stage according to various embodiments.

This example embodiment uses a cache coding method to reduce the load of data links at the server. The processing procedures may be roughly divided into at least two stages: a caching stage and a transmission stage. The control unit is mainly used in the caching stage, and the processing flow of the caching stage in this embodiment may be as shown in FIG. 2. A large number of research conclusions show that the distribution of popularity of video file contents conforms to Zipf's law, and about 20% of the video file contents are requested to be accessed by more than 80% of uses. In this example embodiment, the control unit may first analyze daily requests for video files of users in the network according to auxiliary information sent by the proxy unit of the edge server, rank the video files by the popularity from high to low to obtain the popularity ranking information of the video files; then, randomly select sections of video files which rank highest in the popularity ranking information, and send the sections to the edge server for pre-caching during periods of network link access trough.

Figure 3:
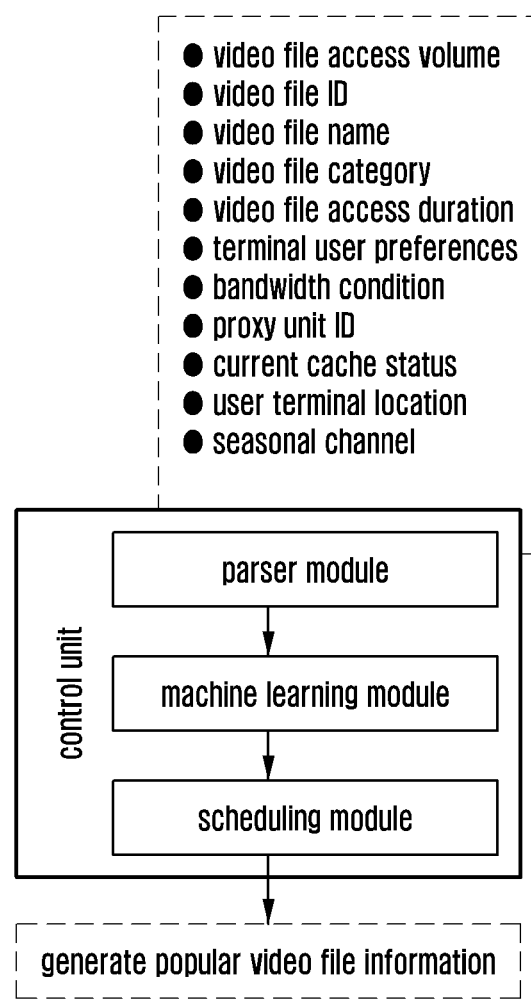
FIG. 3 is a schematic diagram illustrating an example of a control unit in a central server according to an embodiment.

Referring to the schematic diagram of the example of the control unit in this embodiment as shown in FIG. 3, the auxiliary information may include, but is not limited to, one or more of the amount of traffic accessing a video file, the ID of the video file, the name of the video file, the category of the video file, duration of accessing of the video file, terminal user preferences, bandwidth information, the ID of the proxy unit, the current status of the cache, the location of the user terminal, seasonal channels (such as World Cup, Olympic Games), etc.

The control unit may include: a parser module comprising parsing circuitry, a machine learning module comprising circuitry, and a scheduling module comprising circuitry.

The parser module may parse the auxiliary information reported by the edge server, and deliver data obtained from the parsing to the machine learning module for processing.

The machine learning module may collect and obtain popularity ranking information of the video files according to input data.

The scheduling module may preferentially randomly select sections of top-ranking video files according to the popularity ranking information of the video files, and send the sections to the edge server for pre-caching during a network link transmission trough. The time interval of the pre-caching may be set according to the amount of traffic accessing the network and the video files, e.g., may be selected from each day, each week or other pre-defined intervals.

Figure 4:
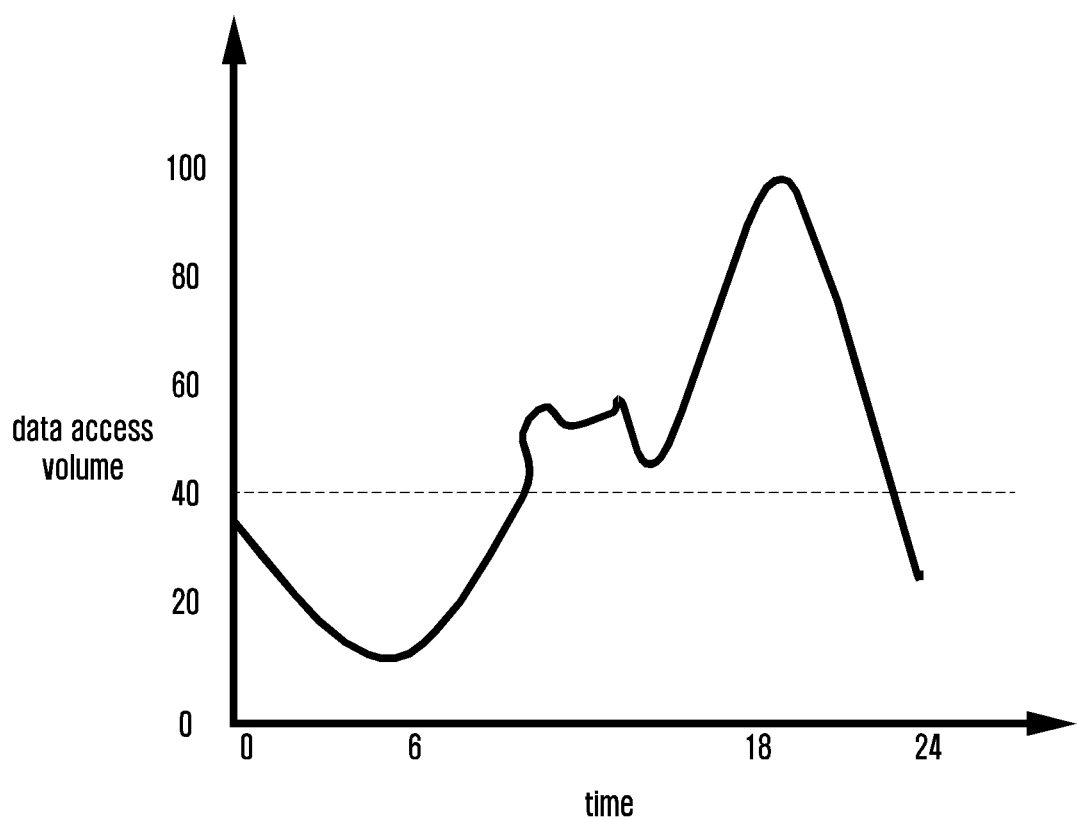
FIG. 4 is a diagram illustrating a variation of network data access volume with time according to an example embodiment.

Referring to the diagram illustrating the variation of network data access volume with time of this embodiment as shown in FIG. 4, in order to make full or better use of the network bandwidth, in this embodiment, the central server selects the network access trough period of 6:00 a.m. every day (or any other suitable trough or other lower period(s)) and randomly selects and sends sections of the top-ranking video files to the edge server for pre-caching. Since user request volume is small and data links are idle during the network link access trough or other low period, this embodiment uses at least one such period(s) for transmitting files to be cached, so as to more effectively utilize idle network bandwidth.

The converting unit is responsible for determining the distribution method(s) corresponding to a user terminal when the user terminal requests a video file. Specifically, the video file requested by the user terminal may be, for example, transmitted through multicast ABR or coded caching depending on the file requested by the user terminal.

Multicast adaptive bit rate streaming (M-ABR) is a multicast-based ABR technique. Compared with unicast ABR, multicast ABR can save more bandwidth during media streaming transmission. Coded caching is a content caching and distributing technique, which encodes the data requested by multiple users to obtain a data stream for transmission according to the data currently requested by the user and the data already cached by the client device, thereby reducing network traffic. Specifically, according to different situations of the video files requested by users, the converting unit may distribute the video files in the following two methods.

Method 1: If multiple user terminals request the same video file at a certain time point, the converting unit uses the multicast ABR to transmit the video file requested by the multiple user terminals in the corresponding time period. As such, the transmission bit rate can be reduce immediately and the transmission efficiency can be improved. For example, at a certain time point, user terminals T1, T2, and T3 all request file A; assuming file A has a size F, using multicast ABR, the content server only needs to transmit file A to the central server once. The transmission bit rate Rs=F. If unicast transmission is used according to the prior art, file A has to be transmitted three times, and the transmission bit rate is Rs=3F. Therefore, this embodiment uses multicast ABR transmission for such case, can greatly reduce the transmission bit rate.

Figure 5:
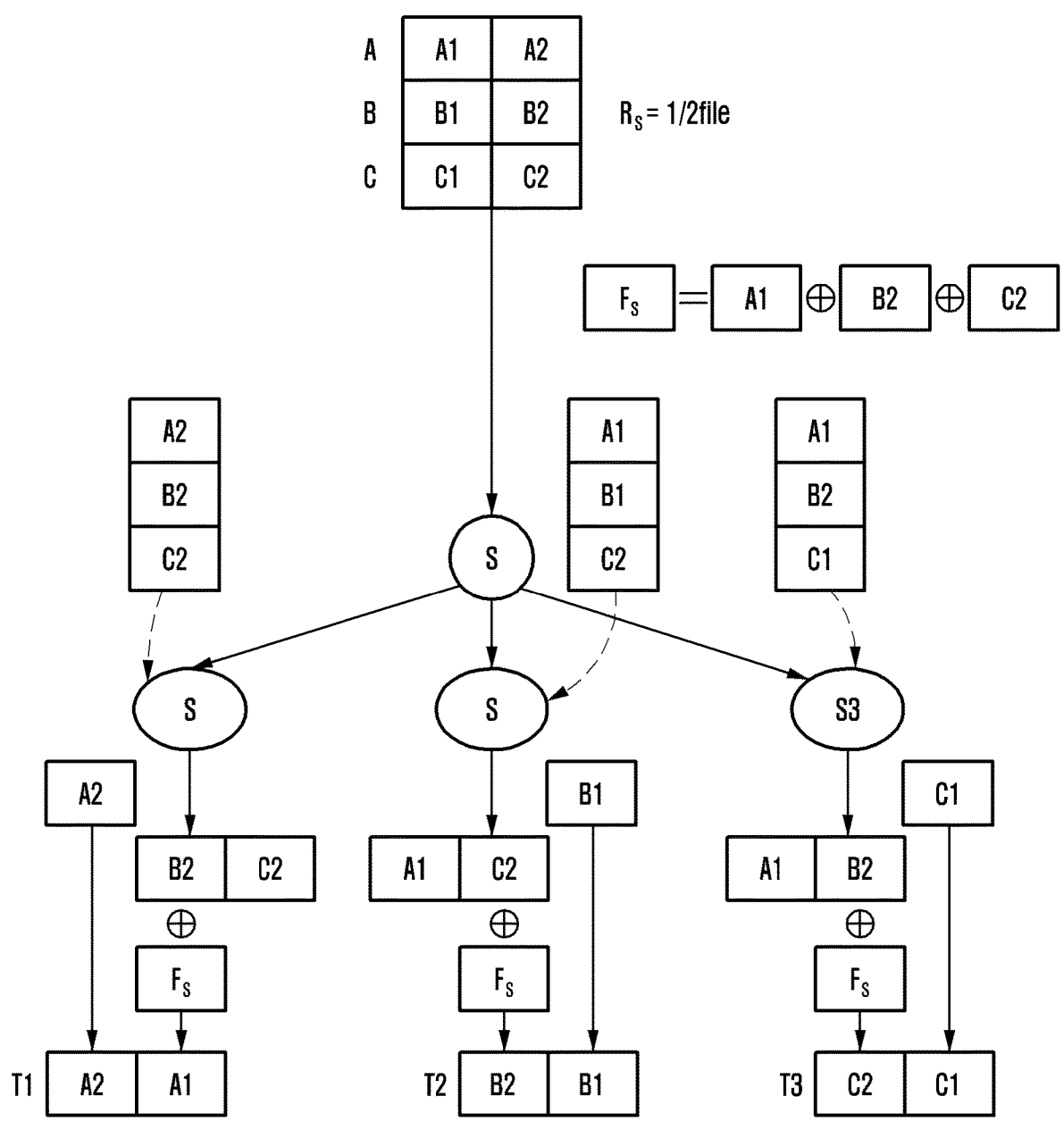
FIG. 5 is a schematic diagram illustrating a coded caching method according to an example embodiment.

Method 2: If the popularity of the video file requested by the user terminal drops at a certain time point, and multiple user terminals start to request different video files, the converting unit may seamlessly switches from the multicast ABR mode to the coded caching mode. In this case, the converting unit encodes the different files requested by the multiple user terminals, and uses the cache coding technique (also called coded caching technique) which can also reduce the transmission bit rate and improve the transmission efficiency. Specifically, in this embodiment, referring to the schematic diagram illustrating the example coded caching method as shown in FIG. 5, the converting unit is responsible for encoding the file requested by the edge server. The encoding may apply bitwise eXclusive OR (XOR) of the file.

In this example embodiment, three files A, B, and C of the same size are pre-stored in the content server, file A is divided into A=(A1, A2), file B is divided into B=(B1, B2), and file C is divided into C=(C1, C2). For facilitating description, this embodiment assumes that the files obtained from the dividing have the same size. Three edge servers S1, S2 and S3 are deployed in the system of this embodiment.

The files pre-cached at edge server S1 are (A2, B2, C2), the files pre-cached at edge server S2 are (A1, B1, C2), and the files pre-cached at edge server S3 are (A1, B2, C1).

The user terminals corresponding to the edge servers S1, S2, and S3 are T1, T2, and T3, respectively.

At a certain time point, files requested by user terminals T1, T2, and T3 are A1, B2, and C2, respectively, and at that time, the files requested by the user terminals have the chance to be encoded and transmitted. That is, in this case, the method of this embodiment can be used to encode and transmit the different files requested by the user terminals, to reduce the transmission bit rate.

In this example embodiment, the encoding method is to apply bitwise XOR operations to the three files A1, B2, and C2 to be encoded, to obtain the encoded content Fs which is denoted by the formula: Fs=A1⊕B2⊕C2. The method of this example embodiment, where edge servers pre-cache sections of multiple files and the other sections of the multiple files are encoded and transmitted to the edge servers when multiple user terminals respectively request other sections of the multiple files, can be referred to as a cache coding transmission method. The example cache coding transmission method of this embodiment can effectively reduce the bit rate of the transmitted files, which can be proved as follows for example.

Figure 6:
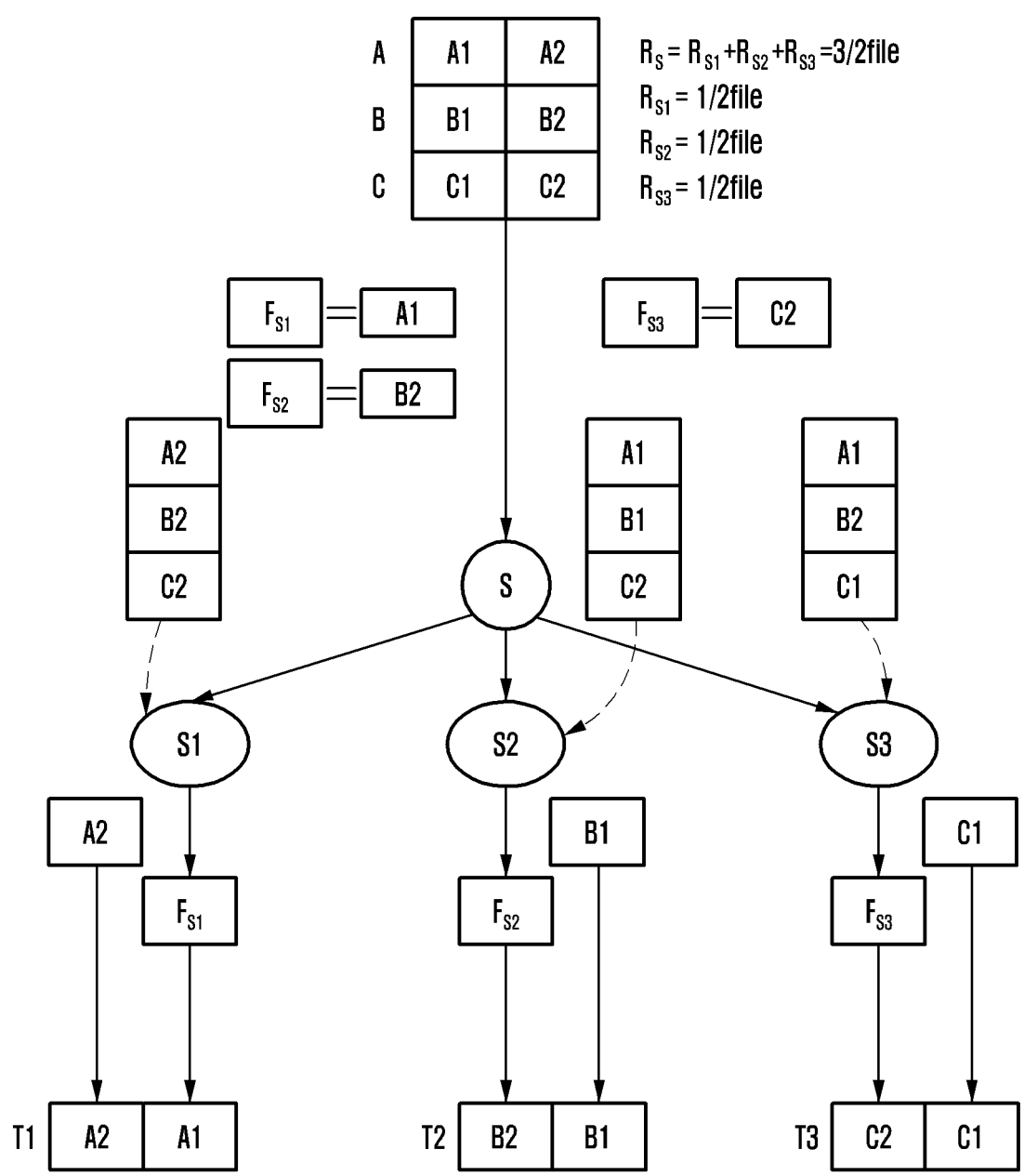
FIG. 6 is a schematic diagram illustrating a conventional method other than coded caching.

Assume files A, B, and C have the same size of F (that is, the file in the drawing), and A1, B2, and C2 are of the size 1/2F. Therefore, the transmission bit rate after the encoding is Rs=1/2F. By contrast, referring to the schematic diagram of the conventional transmission method without encoding as shown in FIG. 6, the conventional transmission method without encoding requires to transmit files A1, B2, and C2 to S1~S3 respectively. Assuming the transmission bit rate of file A1 is $R_{s1}$, the transmission bit rate of file B2 is $R_{s2}$, and the transmission bit rate of file C2 is $R_{s3}$, $R_{s1}$=1/2F, $R_{s2}$=1/2F, $R_{s3}$=1/2F, therefore, the required transmission bit rate is Rs=$R_{s1}$+$R_{s2}$+$R_{s3}$=3/2F. By using the coded caching of this embodiment, the transmission bit rate Rs=1/2F. It can be seen that the coded caching method of this embodiment can greatly reduce the transmission bit rate.

Referring to FIG. 5, the converting unit may send the encoded file Fs to connected edge servers S1, S2, and S3 through multicast.

(3) Edge server: The edge server provides at least functionality of caching video file(s). If a user terminal is far from the edge server, media streaming transmission indicators, including delay, jitter, bandwidth, packet loss rate etc. will be unknown, and QoS cannot be guaranteed. Therefore, in order to quickly respond to file requests of users and to minimize the delay, the edge server is generally deployed close to user terminals in certain example embodiments, thus is actually a file caching server of the user terminals. The edge server may each also provide mobile edge computing (MEC) functionality in various example embodiments. The MEC was first proposed by the European Telecommunications Standards Association in 2014. MEC is defined as: providing IT service environment and cloud computing capabilities at the edge of the mobile network. MEC emphasizes being close to user terminals to reduce the delay of network operations and service delivery, to improve user experience. The MEC system allows devices to offload computing tasks to network edge nodes, such as base stations, wireless access points, etc., which not only meets the requirement of expanding computing capabilities of terminal devices, but also makes up for the shortcomings of long delays of cloud computing. MEC soon became a key technology for 5G, helping to achieve the key technical indicators of 5G services, such as ultra-low latency, ultra-high energy efficiency, and ultra-high reliability, and the like. Edge servers have powerful computing capabilities, can sense the network link status in real time, perform online analysis and processing of videos according to the network link status, thereby can ensure the smoothness of the video and realize intelligent video accelerations. In addition, the edge server can also perform allocation and recovery of air interface resources of user terminals in a local coverage area, thereby increase the utilization ratio of network resources. Multiple edge servers may be deployed in a city or a region. For example, in an office building with many users, an edge server may be deployed near the office building to reduce processing delays. In this embodiment, referring to FIG. 1, the edge server may include a proxy unit, a caching unit, and a data recovering unit.

1) The proxy unit may collect and report auxiliary information to the central server. The auxiliary information may include, but not limited to, the volume of traffic accessing a video file, the ID of the video file, the name of the video file, the category of the video file, the duration of accessing of the video file, terminal user preferences, bandwidth information, the ID of the proxy unit, the current status of cache, the location of a user terminal, seasonal channel (e.g., the World Cup, Olympic Games). As mentioned above, the control unit of the central server may obtain statistics of the volume of traffic accessing video files based on the above auxiliary information and generate the popularity ranking information of the video files. Then, the central server may randomly select sections of the video files according to the popularity ranking information of the video files and send the sections to the edge server during a period of the network link transmission trough, thereby implementing pre-caching of the video files in the edge server. It turns out that in a cache system with good local temporal characteristics, contents that has been referred once is likely to continue to be referenced multiple times in the near future. In a cache system with good local spatial characteristics, if certain contents has been referenced once, the cache system is likely to refer to other contents similar to the contents in the near future. The frequency of sending and updating the cached file may be determined according to the time variation of the popularity of the video files, and may be daily, weekly, or other time lengths. In this embodiment, the frequency of sending the cached file may be selected as daily.

2) The data recovery unit may perform decoding to obtain the original file requested by the user terminal using the received encoded file (e.g., the encoded file) and sections of the file existing in its local cache. Specifically, in this example embodiment, the user terminal T1 is used as an example in the following description with reference to the schematic diagram of the coded caching method as shown in FIG. 5 for example.

The user terminal T1 requests file A, and the edge server S1 has already stored A2, so the edge server requests A1 from the central server. As mentioned above, the central server may apply bitwise XOR to the files requested by the edge servers S1-S3 to obtain the encoded file $Fs=A1 \oplus B2 \oplus C2$, and send the encoded file Fs to the edge servers S1~S3. After receiving the encoded file $Fs=A1 \oplus B2 \oplus C2$ sent by the central server, the edge server S1 performs decoding using files B2 and C2 in its local cache to obtain the requested file A1. Then, the edge server S1 combines the pre-stored file A2 with the decoded file A1 to obtain the entire file A. The decoding processing at edge servers S2 and S3 is similar to the above process, and reference may be made to the decoding process of the edge server S1.

3) The caching unit caches the obtained video file. A lot of research and statistics show that requested video contents are centralized, and the most popular video contents may be repeatedly requested at different time points. Therefore, the caching technique which caches popular video contents at the edge server can reduce the delay for downloading video and reduce the burden of backhaul network links. In order to further meet the ultra-low latency requirements of 5G, the caching technique and the mobile edge computing technique can be combined. When multiple users request the same computing task, the data and services cached at the edge server can effectively reduce the task processing delay.

The edge server sends the file requested by the user terminal to the user terminal, which may be, for example, a TV set-top box, personal computer, tablet computer, mobile phone, or other terminal device.

(4) User terminal: The user terminal may access the edge server, make a file request to the edge server, and receive the file(s) sent by the edge server. The user terminal may select to access the 4G network via an evolved NodeB (eNodeB) or to access the 5G network via a next-generation evolved NodeB (gNodeB) based on network condition and configurations of the user terminal, so that the eNodeB is connected to the edge server via the long-term evolution (LTE) access network, and the gNodeB is connected to the edge server through the next generation radio access network (NG-RAN). The media streaming transmission in this and/or other of various example embodiment(s) may be based on the MPEG-DASH protocol. Video files of different resolutions and bit rates are pre-stored in the content server. Players of user terminals use the standard Web/Internet data request protocol, and do not have to consider the processing of video files at the edge server and the central server in the system.

The user terminal may download video file fragments through a HTTP GET request. The user terminal may download fragments of a corresponding bit rate and a corresponding resolution by evaluating the performances of the user terminal and network bandwidth. When the bandwidth of the user terminal is in good condition, the user terminal may request a segment with a higher resolution and a corresponding bit rate when downloading the next segment. When the bandwidth condition worsens, the user terminal may download the next segment with a lower rate and a lower resolution after the current segment is downloaded. Since fragments of different qualities are aligned with each other in time, thus the video appears natural and smooth when switching between fragments of different qualities. In order to reduce the transmission bit rate, the system may dynamically switch between unicast ABR and multicast ABR when playing a video file, but the process is transparent to players in the user terminals.

Example Embodiment Two

Figure 7:
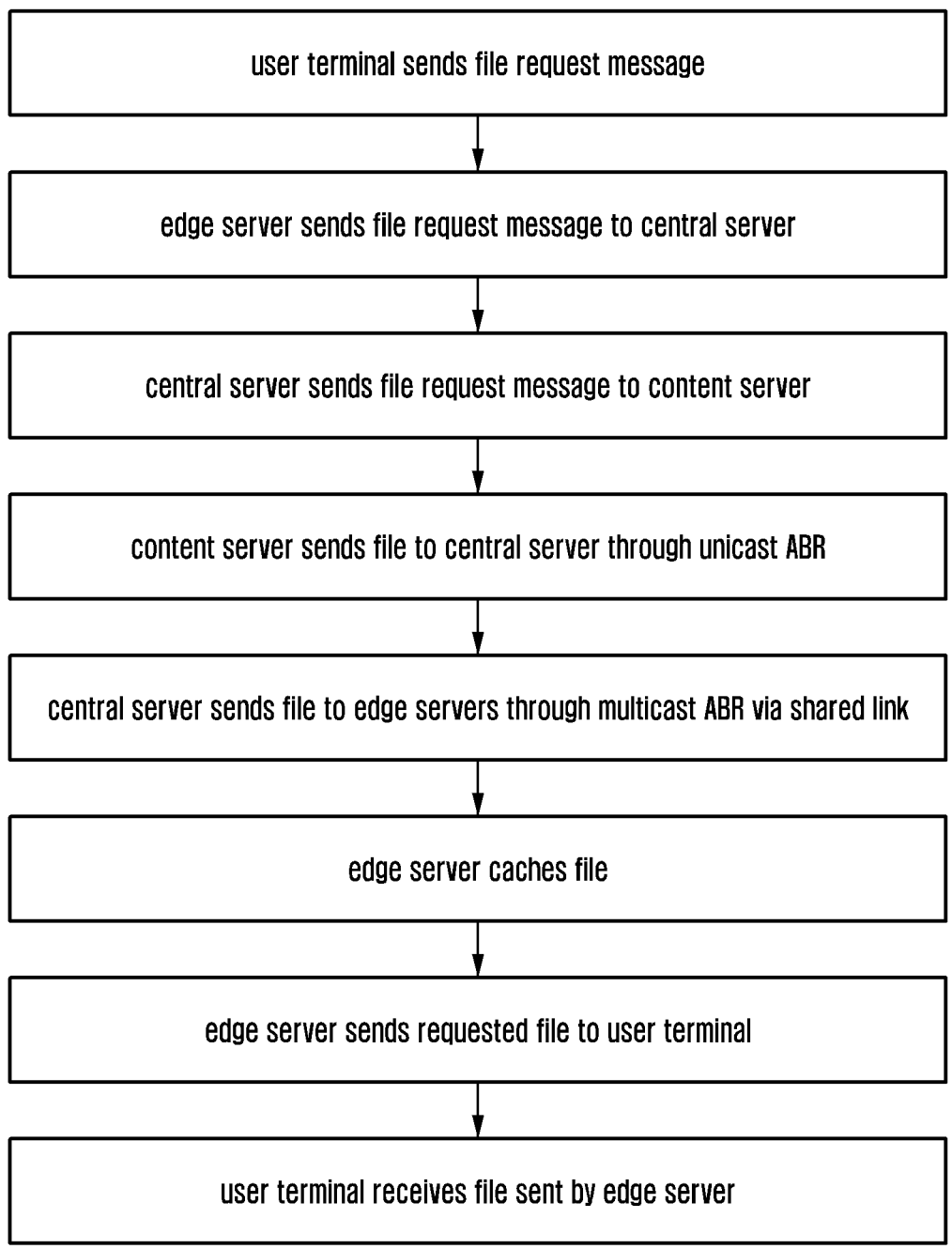
FIG. 7 is a flowchart illustrating a content distribution method based on coded caching and multicast adaptive bit rate streaming in various example embodiments.
Figure 8:
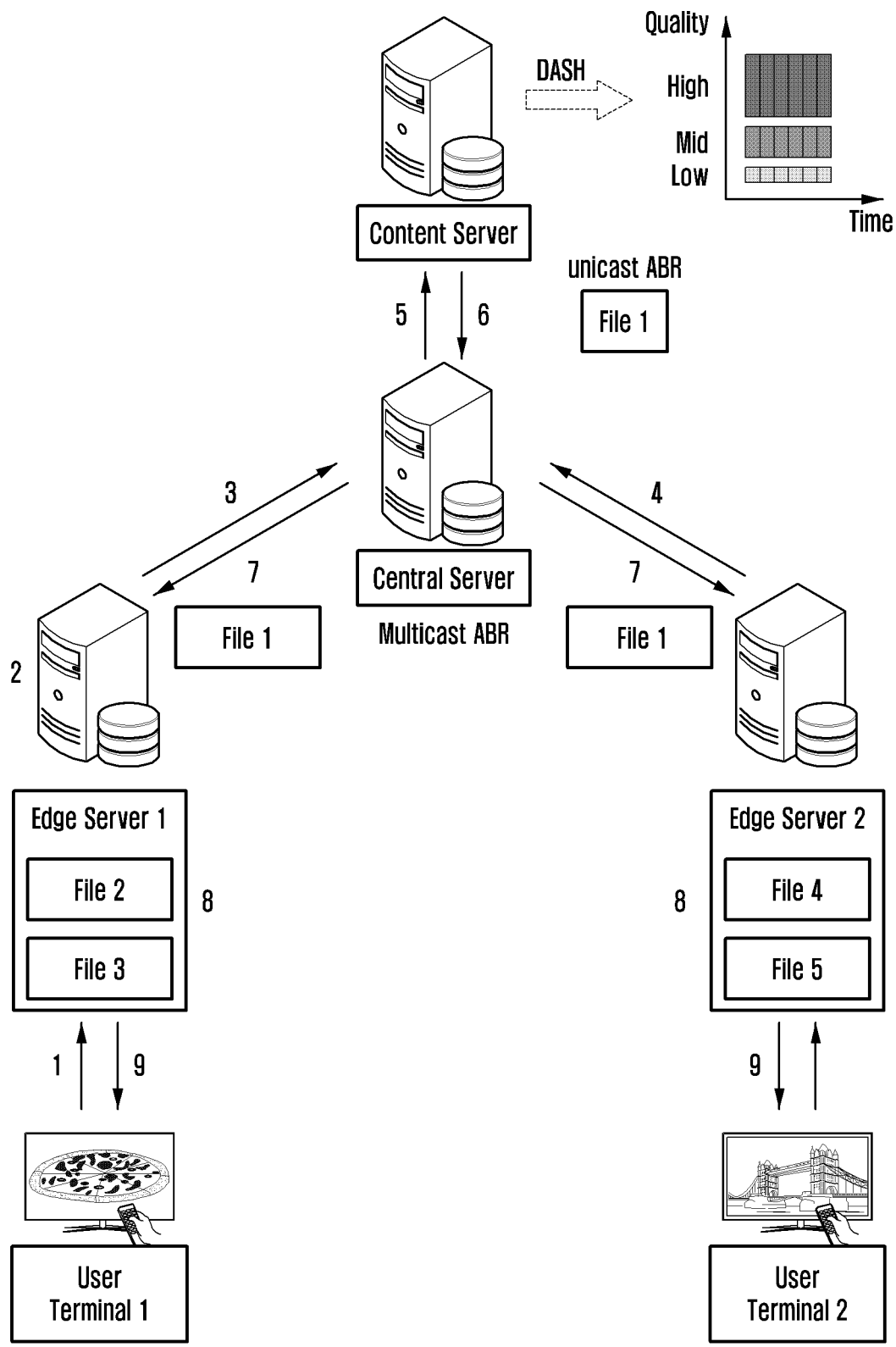
FIG. 8 is a schematic diagram illustrating a system sending a file requested by a user terminal through multicast ABR which may be used with the FIG. 7 embodiment and/or any other embodiments.

Referring to the schematic diagrams as shown in FIG. 7 and FIG. 8, this example embodiment provides an example of a content distribution method based on coded caching, which may include the example steps.

Step 1, user 1 uses a TV terminal to watch movie videos, and a TV set-top box terminal sends a video file request message to an edge server. In this embodiment, the TV set-top box terminal is referred to as "user terminal 1", and the edge server is referred to as node1, e.g., the "Edge Server 1" as shown in the drawings (e.g., see FIG. 8).

Step 2, the edge server node1 corresponding to the TV set-top box terminal processes the video file request message. The edge server node1 first searches for the video file requested by the TV set-top box terminal in a local cache. When it is determined that the requested video file is not cached in the edge server, step 3 may be performed.

Step 3, the edge server node1 sends a video file request message to the central server.

Step 4, similar to user terminal 1, user terminal 2 uses a TV terminal to request the same video file as user terminal 1, and edge server node2 corresponding to the user terminal 2 also sends a request message for the same video file to the central server.

Step 5, the central server sends a video file request message to the content server.

Step 6, the content server sends the video file to the central server through unicast ABR.

Step 7, the central server processes the video file sent by the content server; the converting unit of the central server sends the received video file to edge servers node1 and node2 through multicast ABR.

Step 8, edge servers node1 and node2 respectively process the video file sent by the central server; the caching units of the edge servers node1 and node2 respectively cache the video file.

Step 9, edge servers node1 and node2 send the video file to user terminal 1 and user terminal 2 respectively.

Step 10, user terminal 1 and user terminal 2 play the obtained video file respectively.

Example Embodiment Three

Figure 9:
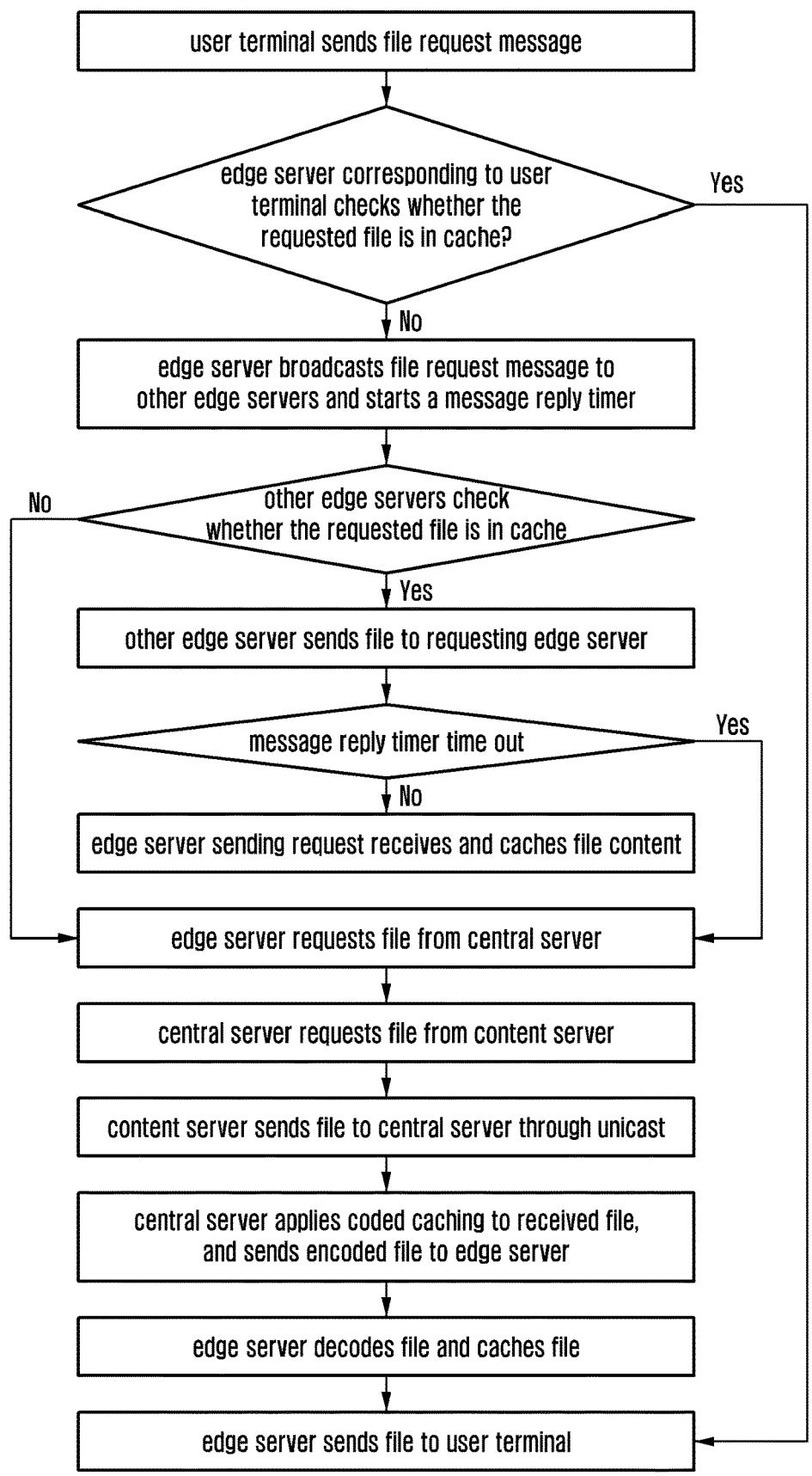
FIG. 9 is a flowchart illustrating a content distribution method based on coded caching and multicast adaptive bit rate streaming in various example embodiments.
Figure 10:
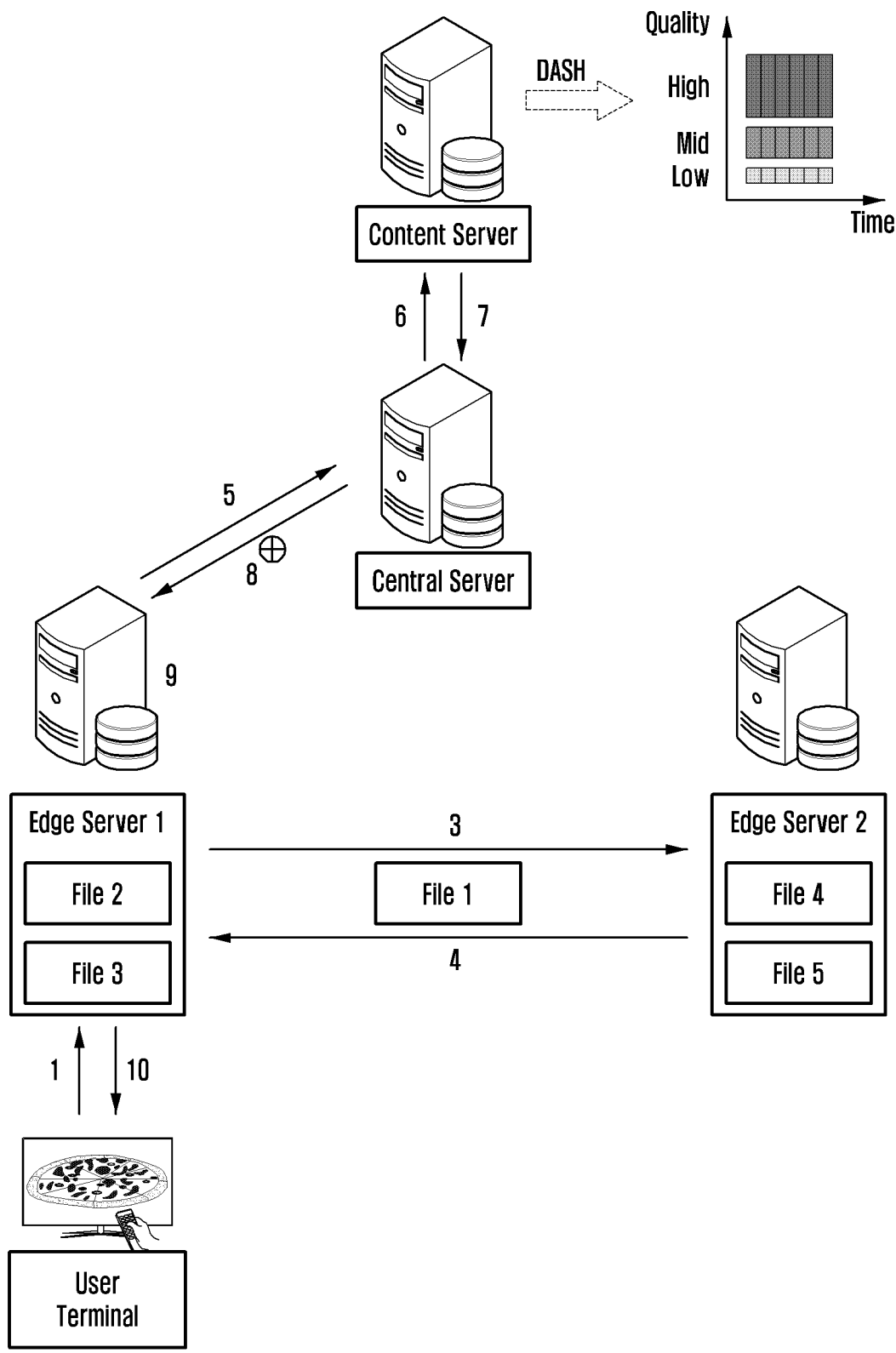
FIG. 10 is a schematic diagram illustrating a system sending a file requested by a user terminal through coded caching which may be used with the FIG. 9 embodiment and/or any other embodiments.

Referring to the schematic diagrams as shown in FIG. 9 and FIG. 10, an example embodiment provides an example of a content distribution method based on coded caching, which may include the following example steps.

Step 1, a user uses a TV terminal to watch the movie "national treasure", and a TV set-top box terminal (e.g., the user terminal as shown in FIG. 10) sends a video file request message to an edge server. In this embodiment, the edge server is referred to as node1, e.g., the edge server 1 as shown in the drawings.

Step 2, the edge server node1 corresponding to the TV set-top box processes the video file request message. The edge server node1 first searches for the requested video file in a local cache. When it is determined the requested video file is not cached in the local cache of the edge server, step 3 may be performed.

Step 3, the edge server node1 sends a broadcast message to other nearby edge servers, inquires whether the other edge servers have the video file requested by the user terminal, and starts a message reply timer T. The duration of the timer may be determined according to network conditions. In this embodiment, the broadcast message request command may be as follows:

```
broadcast_message
{
message_type: "request"
```

-continued

```
request_node: "node1"
request_file: "national treasure"
request_cache: "205"
request_bandwidth="12000000"
request_width="1920"
request_height="1080"
request_framerate="50"
}
```

In the message:

the "message_type" field specifies the type of the message, "request" indicates the message is a file request message;

the "request_node" field specifies the name of the server that sends the message, in this message the video file request is broadcast by an edge server named "node1";

the "request_file" field specifies the name of the requested video file, this message requests the movie "national treasure";

the "request_cache" field specifies the sequence number of the currently requested cache block in the video file, in this message, the requested cache block has a sequence number of 205;

the "request_bandwidth", "request_width", "request_height", and "request_framerate" fields specify the video encoding parameters of the requested video file.

Step 4, after receiving the broadcast message, the other edge servers query whether the requested video file is in respective local cache of the edge servers. In this embodiment, the video file requested by node1 is not in the cache of any other edge servers.

Step 5, the message reply timer T of the edge server node1 times out. Therefore, a video file request message is sent to the central server.

Step 6, the central server sends a video file request message to the content server.

Step 7, the content server sends the video file to the central server through unicast.

Step 8, the central server processes the video file sent by the content server; the converting unit of the central server caches and encodes the received video file, and sends the encoded video file to the edge server node1.

Step 9, the edge server node1 processes the video file sent by the central server; the data recovering unit of the edge server node1 performs decoding to obtain the requested video file based on the received encoded video file and sections of the video file cached in its local cache; the caching unit of the edge server node1 caches the decoded video file.

Step 10, the edge server node1 sends the video file to the TV set-top box; Step 11, the TV set-top box plays the requested video file.

Example Embodiment Four

Figure 11:
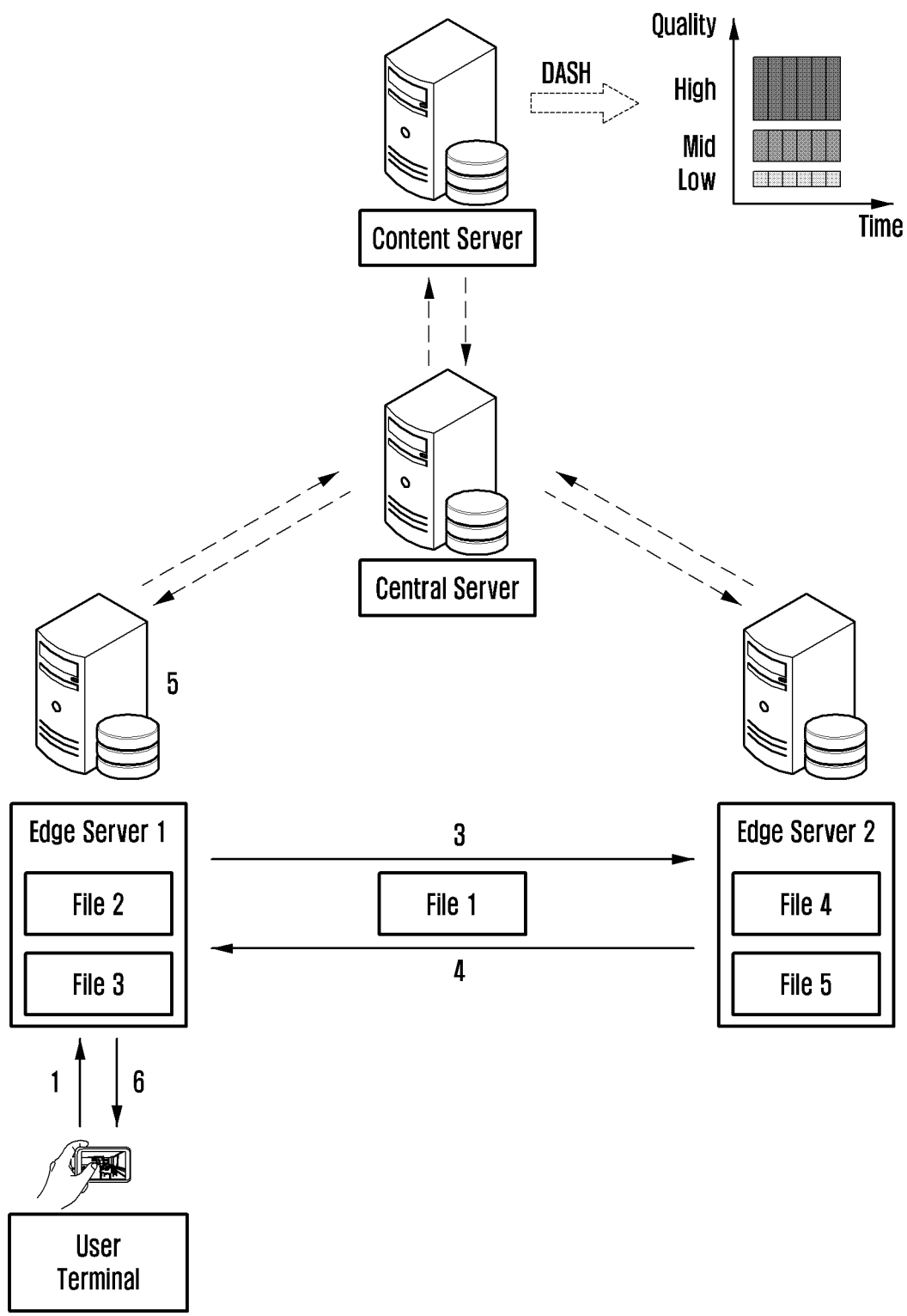
FIG. 11 is a schematic diagram illustrating another edge server in the system sending a file requested by a user terminal in various example embodiments.

Referring to the schematic diagrams as shown in FIG. 9 and FIG. 11, this example embodiment provides another example of the content distribution method based on coded caching. It should be noted that the embodiment is a data processing method/technique based on the 5G system architecture. The method may include the following example steps.

Step 1, a user uses a mobile terminal to watch the video "troy", and the mobile terminal sends a video file request message to the edge server. In this embodiment, the edge server is referred to as node1.

Step 2, the edge server node1 corresponding to the mobile terminal processes the video file request message. The edge server node1 first searches for the requested video file in a local cache of the edge server, finds that the requested video file is not cached in the local cache, and perform step 3.

Step 3, the edge server node1 sends a broadcast message to other edge servers to inquire whether the requested video file is in the cache of any other edge servers, and starts a message reply timer T. The duration of the timer may be determined according to network conditions. In this embodiment, the message request command may be as follows:

```
broadcast_message
{
message_type: "request",
request_node: "node1",
request_file: "troy",
request_cache: "156",
request_bandwidth="12000000"
request_width="1920"
request_height="1080"
request_framerate="50"
}
```

In the message:

the "message_type" field specifies the type of message, and "request" indicates the message is a video file request message;

the "request_node" field specifies the name of the server that sends the message, in this message, the edge server requesting the broadcast of the video file is named "node1";

the "request_file" field specifies the name of the requested video file, in this message, the request file is the movie "troy";

the "request_cache" field specifies the sequence number of the currently requested cache block in the video file, in this message, the requested cache block has a sequence number of 156;

the "request_bandwidth", "request_width", "request_height", and "request_framerate" fields specify the video encoding parameters of the requested video file.

Step 4, after receiving the video file broadcast request message, the other edge servers query whether the requested video file is in respective local cache of the edge servers. In this embodiment, the edge server named node2 has the video file requested by node1 in the local cache. The edge server node2 sends the video file to the edge server node1. In this embodiment, the message reply command may be specified as follows:

```
response_message
{
message_type: 'response',
request_node: 'node1',
response_node: 'node2',
response_file: 'troy',
response_cache: '156',
response_data: '...'
}
```

In the message:

the "message_type" field specifies the type of the message, and "response" indicates the message is a video file response message;

the "response_node" field specifies the name of the node that sent the message, in this message, the edge server responding to the message is "node2";

the "response_file" field specifies the name of the requested video file, in this message, the name of the video file is "troy";

the "response_cache" field specifies the sequence number of the currently requested cache block in the video file, in this message, the sequence number of the cache block is 156;

data following the "response_data" is the contents of the video file transmitted.

Step 5, the edge server node1 receives the video file sent by the edge server node2 within the pre-set timeout time T and caches the video file in the caching unit.

Step 6, the edge server node1 sends the corresponding video file to the mobile phone terminal of the user;

Step 7, the mobile phone terminal of the user plays the requested video file.

Embodiment Five

This embodiment provides an example of the content distribution method based on coded caching. The steps of the exemplary method may be as follows.

Figure 13:
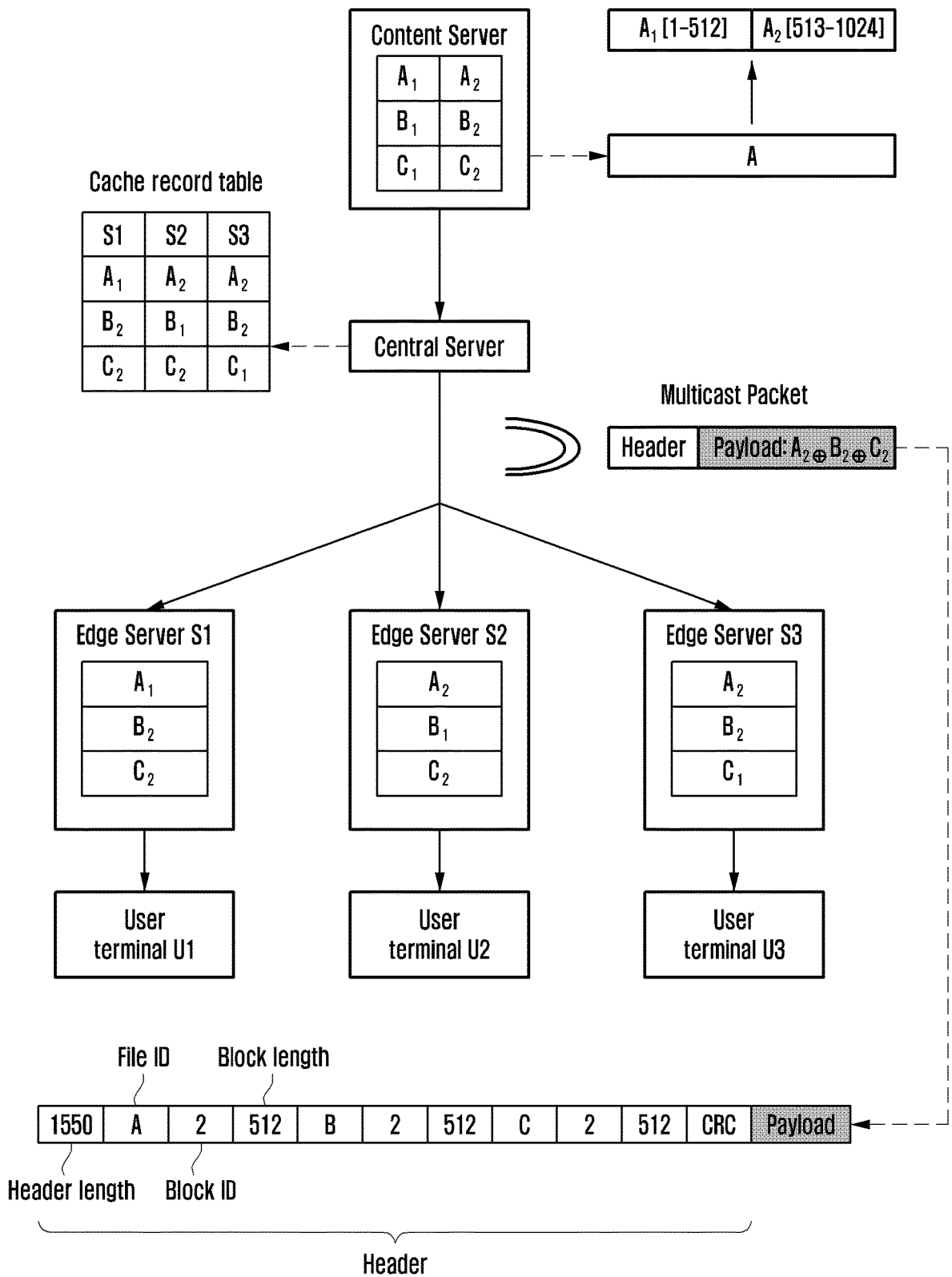
FIG. 13 is a schematic diagram illustrating a content distribution system which may be used with the FIG. 12 embodiment and/or any other embodiments.

Refer to the schematic diagram of the system as shown in FIG. 13. In this system, the content server stores three original files of the same size, denoted as file A, file B, and file C respectively. Before coded caching, the files are firstly divided and stored. The file dividing method used in this example is: dividing each original file into two file blocks of the same size. To facilitate the description of the dividing method, in this embodiment, assume the size of the original file is 1024 bytes. When dividing the file, contents of the first to the 512th bytes of each file serve as the first file block, and contents of the 513th to the 1024th bytes of the file serve as the second file block, respectively denoted as: A=(A1, A2), B=(B1, B2), C=(C1, C2).

In the caching stage, edge server S1 caches file blocks (A1, B2, C2), edge server S2 caches file blocks (A2, B1, C2), and edge server S3 caches file blocks (A2, B2, C1); meanwhile, the central server records information of the file blocks cached by each edge server. In this embodiment, the central server records the information using a cache record table. Referring to the cache record table of the central server in FIG. 13, the cache records of the current edge server may be as follows:

edge server S1 caches file blocks (A1, B2, C2);
edge server S2 caches file blocks (A2, B1, C2);
edge server S3 caches file blocks (A2, B2, C1).

Figure 12:
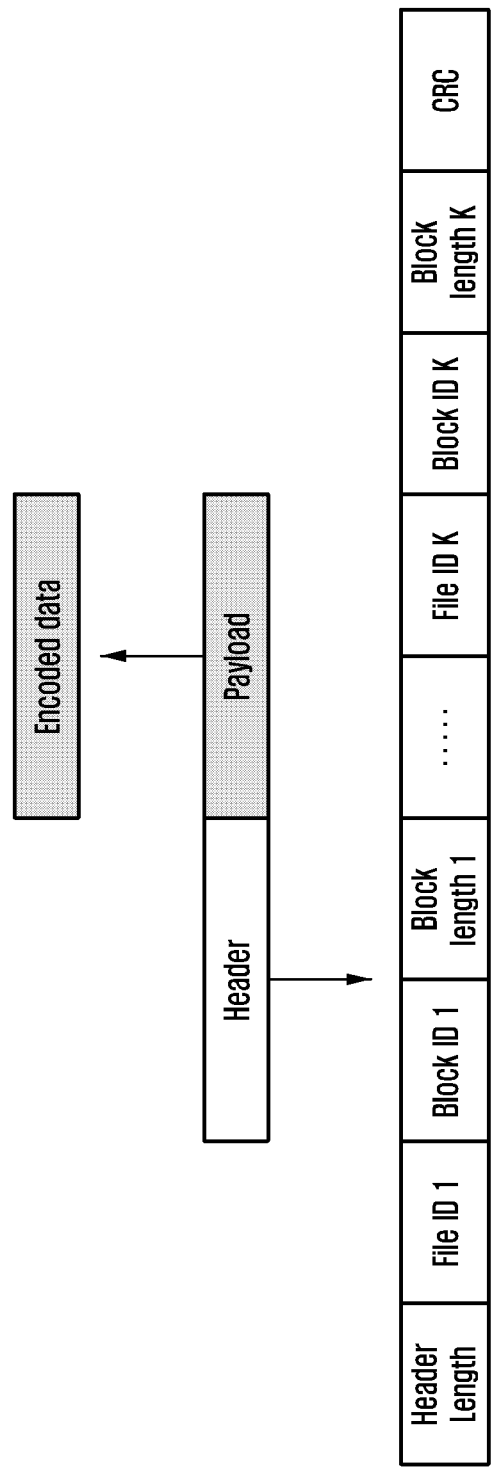
FIG. 12 is a schematic diagram illustrating fields in header information in an example embodiment.

In the transmission stage, data obtained by applying XOR encoding to multiple file blocks is transmitted through multicast. Since the data transmitted through multicast is the encoded contents of multiple file blocks, basic information required by the edge server for decoding is to be added into the packet header of the transmission protocol in order to ensure that each edge server can correctly decode the file blocks required by the edge server. Referring to the schematic diagram as shown in FIG. 12, in this embodiment, the fields bearing the information required by the edge server for decoding in the packet header may include:

(1) Header Length, 4 bytes, being the first field of the packet header, indicating the number of bytes in the entire packet header;

(2) File ID, 1 byte, indicating the sequence number of the file to which the file block transmitted in the payload belongs; in this example, the sequence numbers of the files are A, B, and C respectively;

(3) Block ID, 1 byte, indicating the sequence number of the file block transmitted in the payload in the original file; in this example, the sequence numbers of the file blocks are A2, B2, and C2 respectively;

(4) Block length, indicating the length of each file block transmitted; in this example, the file block lengths are 512, 512, and 512 respectively;

(5) CRC, 4 bytes, cyclic redundancy check code, for checking whether there is a data error during transmission.

Following the packet header may be the payload in an example embodiment. In this example, the payload is the multicast transmission data obtained by applying XOR encoding to the file blocks.

The decoding process at the edge server may be as follows for example: the edge server receives the packet header information, and parses the packet header according to the protocol specification of this embodiment as shown in FIG. 12. During the parsing of packet header information, if the CRC detects an error, the edge server discards the entire encoded packet; otherwise, the edge server checks whether there is a required file block in the encoded packet. If there is, the edge server decodes the file block based on data cached in the edge server, the file ID and file block ID in the header information; otherwise, if the data packet does not include any file block required by the edge server, the edge server discards the packet and waits for receiving the next packet.

In the example of this embodiment, the parsing process at edge server S1 is described as an example. Edge server S1 caches file block A1 in the caching stage. In the transmission stage, in order to obtain the original file A, edge server S1 waits for the central server to transmit an encoded packet including file block A2. After receiving the header information, the edge server parses the file ID and file block ID information in the header information to find out that the packet includes file block A2, so edge server S1 continues to parse the payload A2 $\oplus$B2 $\oplus$C2. Edge server S1 performs the decoding according to file blocks A1, B2 and C2 in the cached data in the following manner:

decoded file block=(multicast payload)$\oplus$(cached file blocks).

In this embodiment, file A2 is obtained by A2=(A2 $\oplus$B2$\oplus$C2)$\oplus$(B2$\oplus$C2), and the original file A is obtained by combining A2 with the cache file block A1.

The decoding process at edge server S2 and edge server S3 is similar to the decoding process at edge server S1, and will not be repeated herein.

Certain example embodiments provide a content distribution system which may include: a content server, a central server, an edge server and a user terminal, wherein:

the content server is configured to store video files accessible by the user terminal, the video files are divided into different sections according to different bit rates, resolutions, and time lengths;

the central server is configured to obtain popularity ranking information of the video files according to video file requesting history of user terminals, and obtain sections of multiple video files which are most popular according to the popularity ranking information from the content server and send the sections to the edge server during a network link transmission trough;

the edge server is a file caching server and a mobile edge computing server of the user terminals, and is configured to cache the sections of the multiple video files which are most popular, and send a video file requested by the user terminal to the user terminal; and the user terminal is connected to the edge server, configured to request a video file from the edge server, and receive the video file sent by the edge server.

The central server may further configured to, when the user terminal requests a video file, send the video file requested by the user terminal to the edge server through multicast ABR or through coded caching depending on the video file requested by the user terminal.

The central server may include a control unit comprising control circuitry and a converting unit comprising converting circuitry, wherein:

the control unit, comprising the control circuitry, is configured to obtain the popularity ranking information of the video files according to the video file requesting history of the user terminals, and obtain the sections of the multiple video files which are the most popular according to the popularity ranking information of the video files from the content server and send the sections to the edge server during a network link transmission trough; record files requested by different user terminals; when file requests are received from multiple user terminals, judge whether the multiple user terminals request the same file or different files, and notify the converting unit of the judging result;

the converting unit is configured to send the video file requested by the user terminal to the edge server through multicast ABR or through coded caching depending on the video file requested by the user terminal when the user terminal requests the video file.

The control unit (which comprises circuitry) includes: a parser module comprising parsing circuitry, a machine learning module comprising circuitry, and a scheduling module comprising circuitry, wherein:

the parser module is configured to parse auxiliary information reported by the edge server, and deliver data obtained from the parsing to the machine learning module for processing;

the machine learning module is configured to obtain popularity ranking information of the video file requested by the user terminal according to input data;

the scheduling module is configured to randomly select section of top-ranking video files according to the popularity ranking information of the video files, and send the sections to the edge server for pre-caching during a network link transmission trough; a time interval of the pre-caching is set according to traffic for accessing a network and the video files, is selected from each day, each week or a pre-defined interval.

The converting unit may be configured to:

when multiple user terminals request the same video file, obtain the video file from the content server, and send the video file to the edge server corresponding to the multiple user terminals through multicast ABR;

when multiple user terminals request different video files, if the edge server corresponding to the multiple user terminals has pre-cached sections of the requested video files while other sections of the requested video files are stored in cache of a second edge server other than the edge server, obtain the video files requested by the multiple user terminals from the content server, encode the video files requested by the multiple user terminals to obtain an encoded file, and send the encoded file to the edge server corresponding to the multiple user terminals.

The edge server may include: a proxy unit, a caching unit, and a data recovering unit, wherein:

the proxy unit is configured to collect and report auxiliary information to the central server, the auxiliary information comprises: traffic volume for accessing a video file, an ID of the video file, a name of the video file, a category of the video file, duration of access to the video file, terminal user preferences, bandwidth information, an ID of the proxy unit, current status of cache, a location of a user terminal, seasonal channel;

the caching unit is configured to cache an obtained video file;

the data recovering unit is configured to, after receiving the encoded file, decode the encoded file according to a video file cached in the caching unit to obtain an original file.

The converting unit may be configured to obtain the encoded file by performing a bit-wise XOR operation on the video files requested by the multiple user terminals.

The header information of a file sent by the central server to the edge server may comprise at least one of:

a header length, indicating a total number of bytes of a header;

a file identification (ID), indicating a sequence number of a file to which a file block transmitted in a payload belongs;

a file block ID, indicating a sequence number of the file block within the original file;

a file block length, indicating a length of each file block transmitted.

Certain example embodiments provide a content distribution method which may include:

obtaining, by a central server, popularity ranking information of video files according to video file requesting history of user terminals, caching in advance sections of multiple video files which are most popular according to the popularity ranking information in the edge server connected to a user terminal during a network link transmission trough;

sending, by the central server when the user terminal requests a video file, the video file requested by the user terminal to the edge server through multicast ABR or through coded caching according to the video file requested by the user terminal.

Preferably, when multiple user terminals request the same video file, the same video file is to the edge server corresponding to the multiple user terminals through multicast ABR;

when multiple user terminals request different video files, if the edge server corresponding to the multiple user terminals has pre-cached sections of the requested video files while other sections of the requested video files are stored in the cache of a second edge server other than the edge server, the video files requested by the multiple user terminals are sent to the edge server corresponding to the multiple user terminals through coded caching.

For example, sending the same video file to the edge server corresponding to the multiple user terminals through multicast ABR may include one or more of the following example steps:

step 1, calculating, by each of the multiple user terminals, a bit rate and a resolution of the requested video file based on current network bandwidth information, sending a video file request message to request the same video file from multiple edge servers respectively;

step 2, sending, respectively by each of the multiple edge servers, a file request messages to the central server;

step 3, sending, by the central server, a file request message to the content server;

step 4, sending, by the content server, the requested video file to the central server through unicast ABR;

step 5, sending, by the central server, the video file to the edge server through multicast ABR via a shared link;

step 6, caching, by the edge server, the video file;

step 7, sending, by the edge server, the requested video file to the user terminal;

step 8, receiving, by the user terminal, the video file sent by the edge server.

Sending the video files requested by the multiple user terminals to the edge server corresponding to the multiple user terminals through coded caching may include one or more of the following example steps:

step 1, calculating, by each of the user terminals, a bit rate and a resolution of the requested video file according to current network bandwidth information, and sending a file request message;

step 2, processing, by the edge server corresponding to the user terminal, the file request message, searching, by the edge server, in a local cache first for the requested video file; if the requested video file is found, performing step 14; otherwise, performing step 3;

step 3, broadcasting, by the edge server, the file request message to nearby edge servers and starting a message reply timer;

step 4, searching, by a nearby edge server, in a local cache for the requested video file;

if the requested video file is found, performing step 5; otherwise, performing step 7;

step 5, sending, by the nearby edge server, the requested video file to the edge server that broadcasts the file request message;

step 6, determining, by the edge server that broadcasts the file request message, whether the message reply timer has expired; if the message reply timer has expired, performing step 8; otherwise, performing step 7;

step 7, receiving, by the edge server that broadcasts the file request message, the video file and caching the video file, and performing step 14;

step 8, sending, by the edge server, a file request message to the central server;

step 9, sending, by the central server, a file request message to the content server;

step 10, sending, by the content server, the requested video file to the central server through unicast;

step 11, encoding, by the central server, the video files that is to be transmitted according to received files sent by the content server and files pre-stored in the cache of the edge server to obtain encoded files, and transmits the encoded files to the edge server through multicast via a shared link;

step 12, decoding, by the edge server, the encoded files obtained from the central server according to sections of files locally pre-cached to obtain the requested file content;

step 13, caching, by the edge server, the requested file;

step 14, sending, by the edge server, the requested file to the user terminal;

step 15, receiving, by the user terminal, the file sent by the edge server.

Header information of the file sent by the central server to the edge server may include at least one of:

a header length, indicating a total number of bytes in a header;

a file identification (ID), indicating a sequence number of the file to which a file block transmitted in a payload belongs;

a file block ID, indicating a sequence number of the file block in an original file;

a file block length, indicating a length of each file block transmitted.

It can be seen from the above technical schemes that the content distribution system and method provided by certain example embodiments adopt a method which combines coded caching and the multicast adaptive bit rate streaming, can effectively reduce the data traffic during data transmissions, reduce the load on data links at the server, reduce the network delay of network transmissions, improve the performances of the entire network, thereby improving the quality of service and experience of the users.

The above are merely example embodiments and are not intended for limiting the present application. Any modification, equivalent substitution, improvement, etc. made within the spirit and principles of the present application should be within protection scope of the present application.

What is claimed is:

1. A content distribution server comprising:
a central server configured to obtain popularity ranking information of video files according to video file requesting history of user terminals, and obtain sections of the video files based on the popularity ranking information from a content server and transmit the sections to at least one edge server; and
a plurality of edge servers each configured to be a file caching server and a mobile edge computing server of a user terminal, each of the edge servers configured to cache the sections of the video files which are received from the central server and send a video file requested by the user terminal to the user terminal,
wherein the central server is configured to:
determine that multiple user terminals have requested the same video file, and based on the determination that the multiple user terminals have requested the same video file, obtain the same video file from the content server and send, using multicast adaptive bit rate streaming (ABR), at least sections of the same video file to the respective edge server corresponding to each of the multiple user terminals having requested the same video file, and
determine that multiple user terminals have requested different video files, and based on the determination that the multiple user terminals have requested different video files, obtain the requested different video files from the content server, encode, using coded caching, sections of the requested different video files to obtain an encoded file, and send the encoded file to a respective edge server corresponding to each of the multiple user terminals that have requested different video files,
wherein coded caching includes encoding at least several sections of the requested different video files requested by the multiple user terminals.

2. The content distribution server according to claim 1, wherein the central server comprises a control unit and a converting unit, wherein:
the control unit comprises control circuitry and is configured to obtain the popularity ranking information of the video files according to the video file requesting history of the user terminals, and obtain the sections of the video files which are the most popular according to the popularity ranking information of the video files from the content server and send the sections to at least one of the edge servers during a time period of network link transmission demand that is lower than a predetermined threshold;
when file requests are received from multiple user terminals, judge whether the multiple user terminals have requested the same file or different files, and notify the converting unit of the judging result;
the converting unit comprises circuitry and is configured to send the video file requested by the user terminal to the edge server using multicast ABR or using coded caching based on the video file requested by the user terminal when the user terminal requests the video file.

3. The content distribution server of claim 2, wherein the control unit comprises: a parser module comprising parsing circuitry, a machine learning module comprising circuitry, and a scheduling module comprising circuitry, wherein:
the parser module is configured to parse auxiliary information reported by the edge server, and deliver data obtained from the parsing to the machine learning module for processing;
the machine learning module is configured to obtain popularity ranking information of the video file requested by the user terminal according to input data;
the scheduling module is configured to randomly select sections of top-ranking video files according to the popularity ranking information of the video files, and send the sections to the edge server for pre-caching during a time period of network link transmission demand that is lower than a predetermined threshold;
wherein a time interval of the pre-caching is set according to a current volume of traffic for accessing a network and the video files, or the time interval of the pre-caching is selected from each day, each week or a pre-defined interval.

4. The content distribution server according to claim 1, wherein the edge server comprises: a proxy unit comprising circuitry, a caching unit comprising a cache, and a data recovering unit comprising decoding circuitry, wherein:
the proxy unit is configured to collect and report auxiliary information to the central server, wherein the auxiliary information comprises at least one of: traffic volume for accessing a video file, an ID of the video file, a name of the video file, a category of the video file, duration of access to the video file, terminal user preferences, bandwidth information, an ID of the proxy unit, current status of cache, a location of a user terminal, and/or seasonal channel;
the caching unit is configured to cache an obtained video file;
the data recovering unit is configured to, after receiving the encoded file, decode the encoded file according to a video file cached in the caching unit to obtain an original file.

5. The content distribution server according to claim 1, wherein:
the converting unit is configured to obtain the encoded file by performing a bit-wise XOR operation on the video files requested by the multiple user terminals.

6. The content distribution server according to claim 1, wherein:
a header information of a file sent by the central server to the edge server comprises at least one of:
a header length, indicating a total number of bytes of a header;
a file identification (ID), indicating a sequence number of a file to which a file block transmitted in a payload belongs;
a file block ID, indicating a sequence number of the file block within the original file; and/or
a file block length, indicating a length of each file block transmitted.

7. The content distribution server according to claim 1, wherein a first edge server of the plurality of edge servers is configured to:

receive video file request message from the user terminal, when video file corresponding to the video file request message is not found in the first edge server, broadcast the video file request message, start a message reply timer based on the broadcast of the video file request message, and when a message reply timer has expired, send the video file request message to central server.

8. The content distribution server according to claim 7, wherein the first edge server is further configured to:

when the video file corresponding to the video file request message is received from a second edge server before the message reply timer expires, send the video file to the user terminal.

* * * * *